C. S. LENOX.
CASTER.
APPLICATION FILED FEB. 11, 1914.
1,147,106.
Patented July 20, 1915.
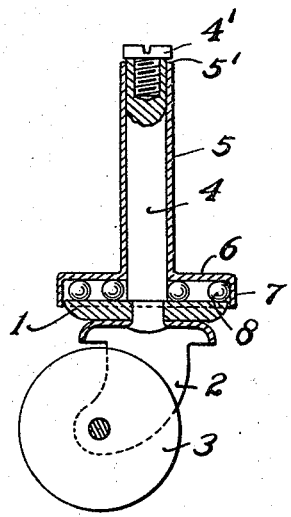
FIG. 1
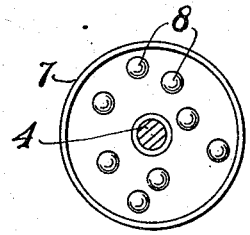 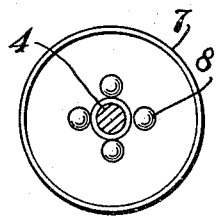 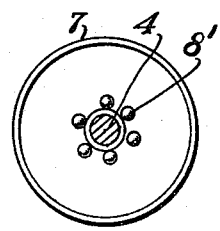
FIG. 2   FIG. 3   FIG. 4
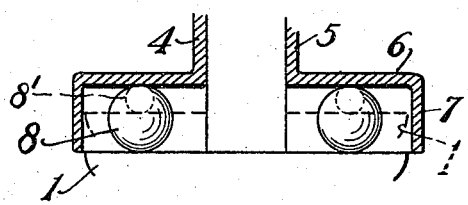
FIG. 5
WITNESSES
Marion C. Hobbs
Victoria Londen
INVENTOR
Calvin S. Lenox.
BY
ATTY.

UNITED STATES PATENT OFFICE.

CALVIN S. LENOX, OF PITTSFIELD, MASSACHUSETTS.

CASTER.

1,147,106.  Specification of Letters Patent.  Patented July 20, 1915.

Application filed February 11, 1914.  Serial No. 818,130.

*To all whom it may concern:*

Be it known that I, CALVIN S. LENOX, a citizen of the United States, residing at Pittsfield, county of Berkshire, Commonwealth of Massachusetts, have invented certain new and useful Improvements in Casters, of which the following is a specification.

This invention relates to casters and particularly to casters of the ball bearing type.

The necessity of instant response in the trailing adjustment of a caster even when under heavy load has made the ball bearing feature of high grade casters a necessity. Upon the degree of its friction or comparative lack of friction, depends its responsiveness and upon its responsiveness depends the certainty that it will not scar such a surface as a highly polished floor.

Lack of friction in a caster is of course a comparative matter and many so called frictionless ball bearing casters develop a very considerable degree of resistance. This I have found is due to the liability of the balls to "lock" or "ride."

It is therefore the object of my present invention to provide for structures in which the rolling members are free to assume any position in relation to each other between the planes against which they rest or revolve.

Another object of my invention is to make possible a standard caster construction in which the number of rolling members is not fixed but in which any number of balls up to the limit of free capacity may be used as the circumstances of the proposed use may warrant.

My invention not only contemplates variation in the number of balls but also in their size by which a standard caster may be adapted for special work or adjusted relative to other members of a set. The features by which I secure these desired results will be more fully set forth in the specification which follows while a preferred form is described therein in connection with the illustration thereof in the drawings, which are associated through the use of corresponding numerals of reference used throughout the drawings and also the specification.

In the drawings: Figure 1 is a section of a caster in accordance with my invention, Fig. 2 is a view of the bearing with eight balls, Fig. 3 is a similar view showing the bearing using only four balls, Fig. 4 is a similar view showing the use of six balls but of smaller diameter, and Fig. 5 is a view illustrating the use of maximum and minimum size balls to secure adjustment.

I have indicated at 1 a bearing disk carrying the usual horns or arms 2 and roller 3. Centrally of the bearing disk 1 extends a spindle 4. Surrounding the spindle 4 is a sleeve 5 having at its lower end a supporting disk 6 having a depending annular flange or rim 7. The upper end of the spindle 4 is fitted with a retaining device as the screw $4^1$ with sufficient space between it and the upper end $5^1$ of the sleeve 5 to permit a proper amount of play. This amount of play is proportioned to the difference in size between the maximum size of ball indicated as 8 and the smallest desirable size indicated as $8^1$.

Referring to Fig. 2, it will be seen that a large number of balls 8 of maximum size are employed (as when a heavy load is to be carried) while in Fig. 3 only four are employed (to support a light load). It will be seen that even in Fig. 2 there is a very considerable freedom of movement of the balls while in Fig. 3 the greatest freedom is possible.

In Fig. 4 I have shown the same size bearing using small balls $8^1$. It will be noted in Fig. 3 and Fig. 4 that even where grouped about the spindle 4 there is no necessity for the balls to ride or jam.

In Fig. 5 I have shown how a caster may be adjusted by the substitution of small balls $8^1$ (indicated in dotted lines) for the large balls 8. In this way, compensating adjustment may be made to equalize inequalities in the legs of furniture.

The size of the balls which may be used in my caster is determined by the effective exposed radius of the bearing disks. That is to say the balls must have a diameter less than the exposed radius. By the term "exposed radius" is meant the space between the outer surface of the spindle 4 and the inner surface of the rim 7. The number of balls which may be used in my caster is limited only by the circumferential capacity of the smallest effective part in which said balls may freely travel. That is to say, the number of balls used must be less than sufficient to completely fill an imaginary circle having the center of the spindle as its center and having a radius equal to the radius of the spindle plus the diameter of a ball placed closely against the spindle.

My invention provides therefore for a freedom of movement in the highest degree as well as ready adjustment and replacement.

Various modifications in the form and construction of my device may obviously be made without departing from the spirit of my invention, if within the limits of the appended claims.

What I therefore claim and desire to secure by Letters Patent is:

1. In a caster, a pair of relatively movable bearing disks having flat oppositely disposed bearing faces and a plurality of balls of less diameter than the exposed radius of said disks and of a number less than the circumferential capacity of the smallest effective part in which said balls might freely travel.

2. In a caster, a pair of relatively movable bearing disks having flat oppositely disposed bearing faces and a plurality of balls of less diameter than the exposed radius of said disks.

3. An adjustable caster comprising a shank, a pair of bearing arms thereon, a wheel journaled in said arms, a flat, ungrooved bearing disk fixed to said shank, a flat ungrooved supporting disk having a central opening through which the shank passes to guide said supporting disk in concentric but separable relation to said bearing disk, means for limiting the degree of separation of said disks, one of said disks having a rim overlapping the edge of the other disk, and a removable and replaceable ball gang of any desired ball diameter in free spacing relation between said disks.

In testimony whereof I affix my signature in presence of two witnesses.

CALVIN S. LENOX.

Witnesses:
VICTORIA LOWDEN,
AGNES V. O'CONNELL.

Copies of this patent may be obtained for five cents each, by addressing the "Commissioner of Patents, Washington, D. C."